United States Patent [19]

Flournoy et al.

[11] 3,943,954

[45] Mar. 16, 1976

[54] PIPELINE TRANSPORTATION OF VISCOUS HYDROCARBONS

[75] Inventors: Kenoth H. Flournoy; Ricardo L. Cardenas; Joseph T. Carlin, all of Houston, Tex.

[73] Assignee: Texaco Inc., New York, N.Y.

[22] Filed: Apr. 29, 1974

[21] Appl. No.: 464,886

[52] U.S. Cl. .................. 137/13; 252/312; 252/355
[51] Int. Cl.² ...................... F17D 1/17; B01F 17/00
[58] Field of Search ............. 252/312, 355; 302/66; 137/13

[56] References Cited
UNITED STATES PATENTS

| | | | |
|---|---|---|---|
| 2,610,900 | 9/1952 | Cross | 302/66 |
| 3,754,561 | 8/1973 | Sharman et al. | 137/13 |
| 3,776,248 | 12/1973 | Titas | 137/13 |

OTHER PUBLICATIONS

Gregory, Uses and Applications of Chemicals and Related Materials, Vol. II, Reinhold Publishing Corp, N.Y., 1944, pp. 158–159.

Primary Examiner—Benjamin R. Padgett
Assistant Examiner—Christine M. Nucker
Attorney, Agent, or Firm—T. H. Whaley; C. G. Ries; Walter D. Hunter

[57] ABSTRACT

A method of transporting viscous hydrocarbons which involves introducing into a pipeline or well-bore with the viscous hydrocarbons a solution containing an anionic surfactant or soap such as sodium tridecyl sulfate or sodium oleate together with a guanidine salt and optionally with an alkalinity agent and/or a nonionic surfactant such as a polyethoxylated alcohol thereby forming a low viscosity salt tolerant oil-in-water emulsion.

10 Claims, No Drawings

PIPELINE TRANSPORTATION OF VISCOUS HYDROCARBONS

BACKGROUND OF THE INVENTION

1. Field of the Invention

This invention relates to an improved method for transporting hydrocarbons thru a pipeline or well-bore. More particularly, this invention relates to the introduction into a pipeline of viscous hydrocarbon or mixture of hydrocarbons together with an aqueous solution of an anionic surfactant and a guanidine salt whereby a low viscosity salt tolerant oil-in-water emulsion is formed which facilitates movement of the hydrocarbon in the pipeline. Optionally the solution may contain an alkalinity agent and/or a nonionic surfactant.

2. Description of the Prior Art

The transportation of heavy crudes by pipeline is difficult because of their low mobility and high viscosity. The usual methods to facilitate the flow of heavy crudes have included cutting them with lighter fractions of hydrocarbons. However, the procedures involves the use of relatively large amounts of expensive hydrocarbon solvents to transport a relatively cheap product. The practice also necessarily requires the availability of the cutting hydrocarbon solvents which, in some instances is inconvenient.

Another method to assist the flow of hydrocarbons in pipeline is the installation of heating equipment at frequent intervals along the pipeline, whereby the crude is heated to reduce its viscosity and thereby facilitate its transport. Heaters employed for this purpose can be operated by withdrawing some of the crude being transported for use as fuel. However, this procedure may result in the loss of as much as 15 to 20 percent of the crude being transported.

Other methods to facilitate transport of heavy crudes have employed thermal viscosity breaking, which, however, produces substantial amounts of gas.

It is known that substantial amounts of water may be introduced into a pipeline containing a stream of viscous crude flowing therethru to reduce the drag on the stream and thus facilitate the flow thru the pipeline. This has been done by the addition of water together with crude into the pipeline such that a water-in-oil emulsion is formed.

It is thus an object of the present invention to provide a transport method for viscous crudes which are difficulty emulsifiable especially in the presence of water with substantial salt content whereby they can be more easily transported by pipeline at a high thru-put rate.

SUMMARY OF THE INVENTION

This invention relates to a method for transporting viscous hydrocarbons such as crude oil in which the hydrocarbon together with an aqueous solution of an anionic surfactant and a guanidine salt and, optionally, an alkalinity agent and/or a nonionic surfactant is introduced into the pipeline with mixing. During the mixing operation an oil-in-water emulsion is formed which is stable in hard water and salt tolerant.

DESCRIPTION OF THE INVENTION

In this invention the aqueous solution added to the viscous hydrocarbon will generally range from a minimum of about 10 percent by volume based on the volume of the hydrocarbon introduced into the pipeline up to a maximum of about 40 percent or more by volume with the preferred amount being about 20 to about 30 percent by volume on the same basis. In the aqueous solution the concentration of the anionic surfactant will range from about 0.01 to about 2.0 wieght percent; the guanidine salt from about 0.05 to about 5.0 weight percent; the alkalinity agent from about 0 to about 1.0 percent and the nonionic surfactant from about 0 to about 1.0 weight percent. Guanidine salts useful in preparing the aqueous solution employed in this invention include guanidine hydrochloride, guanidine acetate, guanidine sulfate, guanidine carbonate, guanidine thiocyanate, guanidine nitrate, etc.

A particularly useful class of anionic surfactants comprises compounds selected from the group consisting of water soluble salts fo alkyl sulfates having from 6 to 20 carbon atoms and water soluble salts of unsaturated aliphatic carboxylic monobasic acids having from 6 to 20 carbon atoms.

Anionic surfactants suitable for use in the aqueous solution used in this invention include for example compounds of the formula:

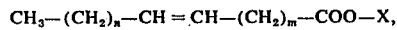

$$CH_3-(CH_2)_n-CH=CH-(CH_2)_m-COO-X,$$

wherein $n$ and $m$ integers and the sum of $n + m$ is from 2 to 16 and X is selected from the group consisting of monovalent ions as exemplified by $Na^+$, $K^+$, $Li^+$, $NH_4^+$, etc. Examples of materials of this type include sodium oleate, potassium stearate, sodium palmitate, sodium myristate, etc.

Another class of compounds which may be employed as the anionic surfactant in the present invention have the general formula:

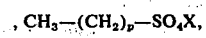

$$CH_3-(CH_2)_p-SO_4X,$$

wherein $p$ is an integer of from 5 to 19 and X is a monovalent cation such as $Na^+$, $K^+$, $Li^+$, $NH_4^+$, etc. Examples of compounds of this type include sodium dodecyl sulfate, potassium cetyl sulfate, sodium decyl sulfate, sodium tetradecyl sulfate, etc.

A wide variety of nonionic surfactants may be used in the process of this invention such as those compounds having the formula:

$$RO(CH_2CH_2O)_tH,$$

wherein R is an alkyl or alkaryl group of from 6 to 20 carbon atoms and $t$ is an integer of from 1 to 20. Compounds of this type include for example:
ethoxylated dodecyl alcohol
ethoxylated nonyl phenol The following examples illustrate embodiments of this invention which are to be considered not limitative:

EXAMPLE I

An aqueous solution containing 0.7 weight percent of sodium dodecyl sulfate, 0.10 weight percent of guanidine hydrochloride about 0.10 weight percent of sodium hydroxide and 0.12 weight percent of ethoxylated dodecyl alcohol of the formula $CH_3-(CH_2)_{10}-CH_2-O-(CH_2CH_2O)_{7.8}H$ was prepared by adding with mixing the above-mentioned ingredients to water having a salinity of about 1.89 weight percent at a temperature of about 25°C after which the thus-prepared solution is introduced with mixing into a large diameter pipeline together with sufficient Richfield crude oil, Orange County, California to give an oil-in-water emulsion in which the amount of aqueous solution is about 20 percent by volume based on the volume of the crude. The horsepower requirements for transporting the formed oil-in-water emulsion through the pipeline at the rate of 1000 barrels per day is found to be substantially less than the horsepower requirement for transporting the same volume of Richfield crude under the same conditions.

EXAMPLE II

An aqueous solution comprising about 0.5 weight percent sodium oleate, 0.12 weight percent guanidine sulfate and about 0.10 weight percent potassium hydroxide is formed by mixing together at a temperature of about 25°C the above-name ingredients with brine having a salinity of about 1.62 weight percent. The thus-formed aqueous solution is introduced into a pipeline together with Hunton crude, Hunton County, Oklahoma to give an oil-in-water emulsion in which the volume percent of the aqueous solution based on the volume of the crude is aabout 25 percent. An appreciable saving in horsepower requirement for pumping 1500 barrels/day of the emulsion through the pipeline over the requirement for the same amount of Hunton crude under the same condition is achieved.

What is claimed is:

1. In the transportation of viscous hydrocarbons of pipeline, the improvement which comprises forming an oil-in-water emulsion by introducing into the pipeline with said hydrocarbons an aqueous solution of about 0.1 to about 2.0 percent by weight of an anionic surfactant and about 0.05 to about 5.0 percent by weight of a quanidine salt, and wherein the said surfactant is selected from the group consisting of water soluble salts of alkyl sulfates having from 6 to 20 carbon atoms and water soluble salts of unsaturated aliphatic carboxylic monobasic acids having from 6 to 20 carbon atoms.

2. The process of claim 1 wherein the said anionic surfactant is sodium dodecyl sulfate.

3. The process of claim 1 wherein the said guanidine salt is selected from the group consisting of guanidine hydrochloride, guanidine acetate, guanidine sulfate, guanidine carbonate, guanidine thiocyanate and guanidine nitrate.

4. The process of claim 1 wherein the said guanidine salt is guanidine hydrochloride.

5. In the transportation of viscous hydrocarbons by pipeline, the improvement which comprises forming an oil-in-water emulsion by introducing into the pipeline with said hydrocarbons an aqueous solution comprising from about 0.01 to about 2.0 percent by weight of an anionic surfactant, from about 0.05 to about 5.0 weight percent of a guanidine salt from 0 to 1.0 weight percent of an alkalinity agent and from 0 to about 1.0 weight percent of a nonionic surfactant, wherein the said anionic surfactant is selected from the group consisting of water soluble salts of alkyl sulfates having from 6 to 20 carbon atoms and water soluble salts of unsaturated aliphatic carboxylic monobasic acids having from 6 to 20 carbon atoms, wherein the said alkalinity agent is selected from the group consisting of sodium hydroxide, potassium hydroxide and mixtures thereof and wherein the said nonionic surfactant is a compound of the formula:

$$RO(CH_2CH_2O)_tH$$

wherein R is an alkyl or alkaryl group of from about 6 to about 20 carbon atoms and $t$ is an integer of from 1 to 20.

6. The process of claim 5 wherein the said anionic surfactant is a water soluble salt of the formula:

$$CH_3-(CH_2)_p-SO_4-X$$

wherein $p$ is an integer of from 5 to 19 and X is selected from the group consisting of monovalent metal ions and the ammonium ion.

7. The process of claim 5 wherein the said anionic surfactant is a water soluble salt of the formula:

$$CH_3-(CH_2)_n-CH=CH-(CH_2)_m-COO-X$$

wherein $n$ and $m$ are integers, the sum of $n + m$ is from 2 to 16 and X is selected from the group consisting of monovalent metal ions and the ammonium ion.

8. The process of claim 5 wherein the said anionic surfactant is sodium dodecyl sulfate.

9. The process of claim 5 wherein the said anionic surfactant is sodium oleate.

10. The process of claim 5 wherein the said nonionic surfactant is ethoxylated dodecyl alcohol.

* * * * *